United States Patent [19]

Gaalema et al.

[11] Patent Number: 4,743,762
[45] Date of Patent: May 10, 1988

[54] NOISE IMMUNE INFRARED READOUT CIRCUITRY AND TECHNIQUE

[75] Inventors: Steve D. Gaalema, Encinitas; Mary J. Hewitt, Santa Barbara; Arthur L. Morse, Hawthorne, all of Calif.

[73] Assignee: Hughes Aircraft Company, Los Angeles, Calif.

[21] Appl. No.: 895,649

[22] Filed: Aug. 12, 1986

Related U.S. Application Data

[63] Continuation-in-part of Ser. No. 683,983, Dec. 20, 1984.

[51] Int. Cl.$^4$ ................................................ G01T 1/22
[52] U.S. Cl. .................................. 250/336.1; 250/370
[58] Field of Search .................. 307/311; 250/338 R, 250/370 R; 357/30 G, 30 R; 377/60, 58

[56] References Cited

U.S. PATENT DOCUMENTS

| | | | |
|---|---|---|---|
| 4,242,706 | 12/1980 | McCormack et al. | 250/338 |
| 4,360,732 | 11/1982 | Chapman et al. | 250/332 |
| 4,523,326 | 6/1985 | Hewitt et al. | 357/24 |

Primary Examiner—Janice A. Howell
Attorney, Agent, or Firm—Ronald L. Taylor; A. W. Karambelas

[57] ABSTRACT

A new technique, and output encoding circuits using that technique, are disclosed for interfacing between a semiconductor IR detector 23 and associated output electronics 24, 25, 26, which technique and circuits transfer a charge packet onto a sense capacitor 22 that previously stored a reset level signal. The resulting stepped signal change, or delta, in the voltage present on that capacitor 22 is employed as the output signal.

3 Claims, 3 Drawing Sheets

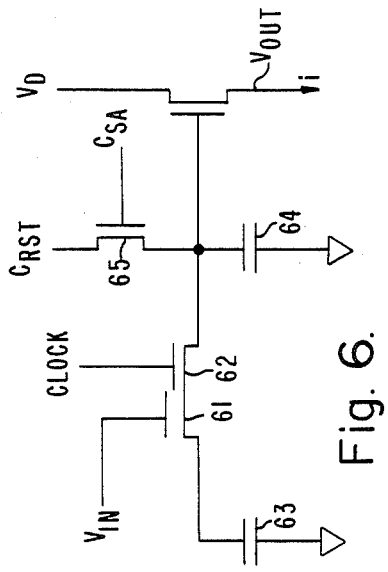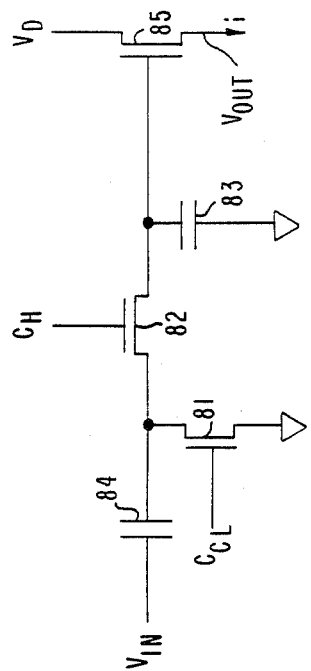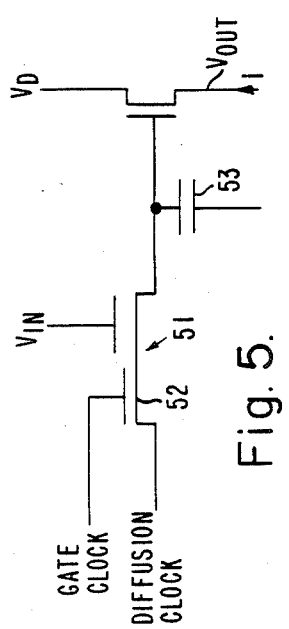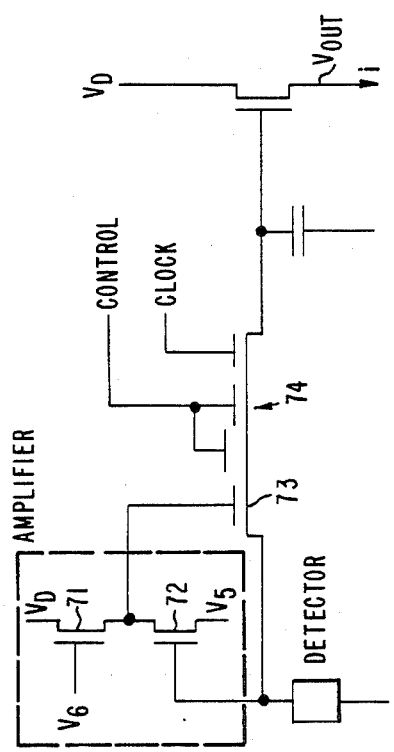
Fig. 5.
Fig. 6.
Fig. 7.
Fig. 8.

NOISE IMMUNE INFRARED READOUT CIRCUITRY AND TECHNIQUE

CROSS REFERENCE TO RELATED PATENT APPLICATIONS

The present patent application is a continuation-in-part of an application Ser. No. 683,983 filed on Dec. 20, 1984 entitled "Noise Immune Infrared Readout Circuitry and Technique," by Steve D. Gaalema, Mary J. Hewitt, and Arthur L. Morse, assigned to the Hughes Aircraft Company.

It is related to a U.S. patent application filed on Dec. 17, 1984 entitled "Integrating Capacitively Coupled Transimpedance Amplifier," having Ser. No. 682,112 and also assigned to the Hughes Aircraft Company.

BACKGROUND OF THE INVENTION

Various infrared devices, including but not limited to charge-coupled device imagers formed on a semiconductive substrate, are described in Wolfe et al., *The Infrared Handbook*, Office of Naval Research, Department of Navy, 1978, particularly at pages 12-27 through 12-54. Such imagers typically comprise a photodetector, some type of storage component which integrates the detector photocurrent, and a multiplexing circuit. In the case of charge-coupled imagers, the multiplexing circuit is generally implemented with a CCD by an array of parallel charge coupled device (CCD) serial registers which receive the integrated charge from adjacent photodetectors on the substrate. Often the parallel CCD registers are arranged in vertical columns, all of their outputs being connected to a single horizontal CCD register which serves as a multiplexer for the output signals. The column CCD registers are connected to a common input diffusion and common input gate which separately introduces a bias charge, termed a FAT zero charge packet, into each of the registers.

The imaging ability of such devices is basically noise limited. It is necessary to deal with at least the following noise sources: (1) bias level noise on the reset level, (2) bias level noise on the substrate level, (3) kTC or switching noise, and (4) 1/f noise associated with source followers.

Certain techniques for reducing the effect of such noise sources on the signals produced by CCD imagers are described in a patent application entitled "Low Noise Charge Coupled Imager Circuit" by M. J. Hewitt and A. L. Morse, filed with the U.S. Patent and Trademark Office on Jan. 17, 1983 as Ser. No. 458,607 and assigned to Hughes Aircraft Company now U.S. Pat. No. 4,523,326, issued June 11, 1985. The present invention concerns a technique, and circuits based thereon, for further and significantly minimizing the effects of noise on the output of CCD imagers or any type of integrating infrared device including a few simple elements on the semiconductor substrate at the output of the multiplexing circuitry or adjacent to each photodetector. As a result of such noise reduction circuits and technique, it is feasible to employ surface-channel enhancement mode devices instead of buried-channel devices, which do not perform well at the low temperature typical of many space sensor systems. However, surface-channel circuits are susceptible to 1/f noise; the circuits and technique disclosed herein minimize such 1/f noise. Because of the reduction of noise in the output signal achieved for each IR detector using the techniques and circuits described herein, the resulting imagers can be used effectively in high-EMI environments. Also, the noise limitations imposed on drive electronics for the imagers can be reduced.

In addition to their low-noise features, the circuits and technique disclosed herein have the additional advantage of not requiring a full-frame memory to establish differences in signal levels, and in turn the output signal for each photodetector. This reduces the number of digitizations required to process the resulting data, and also reduces the number of bits used in the A/D conversion process. Also, since all capacitors in the circuitry of the arrays disclosed herein can be set at once rather than individually, the number of transitions of the output occurring while a pixel is addressed is reduced. This permits faster readout rates to be employed, and causes less power dissipation since the output can slew at a slower rate. Moreover, the new technique and circuits described herein can be used in a radiation environment since they reduce the effects of (1) threshold drift, (2) increased 1/f noise of the source follower, and (3) increased surface mobility.

SUMMARY OF THE INVENTION

The present invention provides a new technique, and circuits employing that technique, for reading and encoding signals in an infrared (IR) imaging system. Typically such circuits will interface between a semiconductor IR detector or the multiplexing electronics for the detector array and off-chip output analog processing electronics.

These circuits, in their various forms, all incorporate what can be termed a delta transfer technique. It is a technique for transferring a sequence of signals to output electronics in an interval significantly less than the interval required by the IR photodetector to change from a reset level to an output level indicative of the sensed IR radiation (termed a frame interval).

The technique described herein for achieving a relatively noise immune infrared readout circuit may be generally described as providing a first capacitive element to which means are connected to impose an initial signal on the element representative of the reset level of an IR photodetector. Means are connected to the photodetector to accumulate a signal representative of the output of the photodetector during a frame interval. Further means are provided in the circuit, and by the technique, to produce an output signal (e.g., a stepped voltage) proportional to the difference between the initial signal on the capacitive element and the accumulated signal representative of the output of the photodetector, this output signal being produced in a period substantially less than the frame interval. Various circuits are described for employing this technique in both photoconductive and photovoltaic semiconductor IR detectors systems and arrays.

BRIEF DESCRIPTION OF THE DRAWINGS

The invention is further described with reference to the accompanying drawings, in which:

FIG. 5 is a schematic diagram of another circuit employing the technique of the present invention;

FIG. 6 is a schematic diagram of yet another circuit employing the technique of the present invention;

FIG. 7 is a schematic diagram of another circuit employing the technique of the present invention; and FIG. 8 is a schematic diagram of still another circuit employing the technique of the present invention.

DESCRIPTION OF THE PREFERRED EMBODIMENT

Before discussing the technique and the various circuits employing it for achieving a relatively noise immune output signal from the detectors in an array of infrared detectors, it is desirable to briefly review a few of the previous techniques that have been used to read out and encode the output from such detectors.

Figure 1:
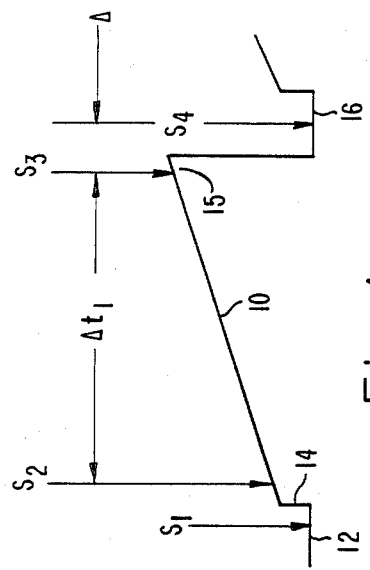
FIG. 1 is a diagram representing a waveform of an IR detector.

Whether the IR detector is of a photoconductive or a photovoltaic type, its output will appear generally as represented in FIG. 1 by the solid line of waveform 10. The lowest level 12 of that output is the reset level, the level to which the detector is set at the beginning of each frame. After being reset, typically the detector will be switched in by a switching field effect transistor FET, the gate of which will have some charge, which charge causes a slight step or increment 14 in the output waveform 10. The output of the detector then increases to a level determined by the IR radiation to which it is exposed. At the end portion of each frame interval, the detector system is again reset from a peak level 15 to a reset level, represented by signal portion 16, which begins the next frame of the image.

The output signal for the photodetector is generally the difference between the signal at $S_2$ and at $S_3$ of the output waveform 10. One technique for determining this difference is referred to as double-correlated sample and hold. It samples the waveform just after and then just before reset, i.e., at $S_2$ and $S_3$, thereby eliminating the kTC noise associated with switching. Since noise will vary somewhat the height of signal step 14, which noise will be common to both $S_2$ and $S_3$, by differencing $S_2$ and $S_3$ this noise can be cancelled. However, because such sampling is done over a time period delta $t_1$ which typically is on the order of several thousand microseconds, the double-correlated sample and hold technique is susceptible to low-frequency substrate and 1/f noise. Also, since this technique requires storage of the first level $S_2$ until the second level $S_3$ is sampled, a full-frame memory is necessary. Further, since this technique requires subtraction, it is necessary to use additional bits in the A/D conversion process to maintain the same accuracy.

Another technique used previously to achieve an output signal for an IR detector is called the delta reset method. It samples the photodetector's output 10 at $S_3$ and then at $S_4$ (the interval being termed delta $t_2$). Since this interval is relatively short, on the order of a few microseconds, 1/f noise will be minimized. Also, because level $S_3$ and then level $S_4$ are sampled during a period considerably less than that required for a full frame, full-frame memory storage of the signals are not needed. However, kTC noise and switching noise associated with the resetting operation will be added to the output signal. In addition, the difference of fluctuations during delta $t_1$ on the substrate and reset bias supplies will be added to the output signal as well.

A third method for producing an output signal for an IR detector incorporates parts of both of the foregoing techniques. It is called the double-correlated delta reset method. Using it, the photodetector's output 10 is sampled at $S_1$, $S_2$, $S_3$ and $S_4$, the associated electronics then producing an output representing $(S_3-S_4)-(S_2-S_1)$. Because the sample times are on the order of delta $t_2$, as in the delta reset method, the 1/f noise is attenuated considerably. However, this approach requires a full-frame memory and additional bits in the A/D conversion process.

From these examples of prior techniques, at least two major problems in encoding the output signal of a photodetector are apparent: (1) there is a lack of noise immunity associated with measuring the integrated signal coming from the detector, and (2) there is severe noise degradation during readout and off-chip decoding of the signal. The techniques previously employed to achieve an output signal for such IR detector arrays deal with these problems in a less than adequate manner; the technique disclosed herein essentially solves these problems.

The basic technique of the present invention for significantly improving the noise immunity of infrared readout circuitry involves storing a signal equal or proportional to the reset signal $S_2$ then, at time $S_3$, reading that signal and then a signal related to $S_3$, or the difference between these two, the resultant output being the output of the infrared photodetector for that frame. The present invention may be embodied in any of various circuits.

Figure 2A:
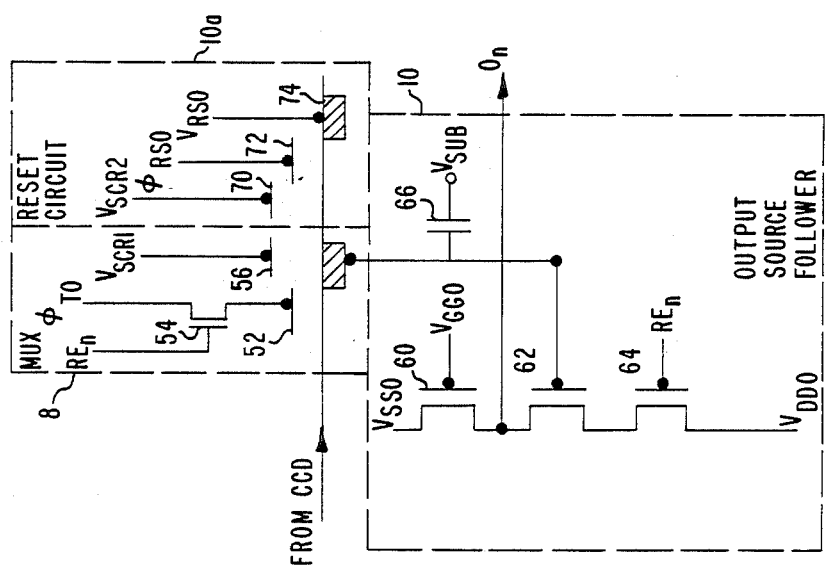
FIG. 2a is a schematic diagram of one circuit for a CCD image detector, the circuit employing the technique of the present invention.

One circuit embodying the technique is shown in FIG. 2a. It may be referred to as a delta transfer circuit. This form of the circuit is compatible with CCD multiplexing. The circuit includes a storage capacitor 66. The capacitor is reset by pulsing $R_{SO}$ causing the capacitor to be set to $V_{RSO}$. Thereafter the clock signal $T_O$ is pulsed, causing the charge packet stored in the CCD to be transferred onto the output diffusion 50. The output voltage $O_n$ transitions from the voltage associated with $V_{RSO}$ on capacitor 66 to a voltage proportional to the transferred charge packet, which completes the sequence and encodes the difference between $S_2$ and $S_3$ as a voltage step at the output $O_n$.

Figure 2:
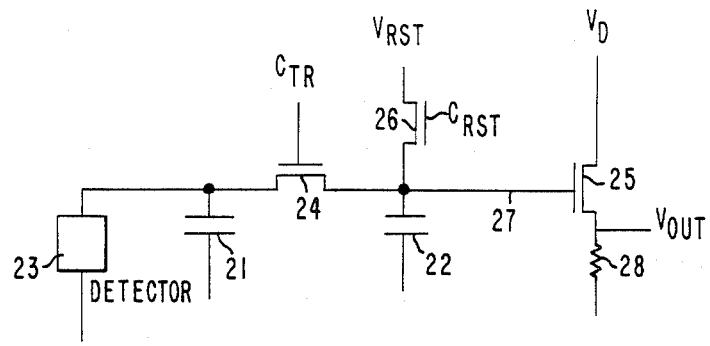
FIG. 2 is a schematic diagram of another circuit employing the technique of the present invention.

Another circuit embodying the technique is shown in FIG. 2. It includes two capacitors, 21 and 22, connected in parallel and to an infrared photodetector 23. An FET 24 is connected between the two capacitors, and the output of the second capacitor 22 is applied to the gate of an FET 25. FET 26 applies a reset voltage ($V_{RST}$) to line 27 when the pulse from a clock reset signal ($C_{RST}$) is applied to the gate of FET 26. At the same time, a pulse applied to the gate of FET 24 (the pulse being part of a clock signal $C_{TR}$) applies the reset voltage to capacitor 21. Thus, both capacitors 21 and 22 are reset to a known and measured value, $V_{RST}$. Then both FETs 24 and 26 are turned off by their respective clock signals, and the output of detector 23 is integrated by the temporary storage capacitor 21, resulting in a waveform much like that shown in FIG. 1. The output of the circuit ($V_{OUT}$) is read across a resistor 28 by first reading the quiescent voltage determined by (or proportional to) the reset level on capacitor 22, then the transfer FET 24 is clocked by applying an appropriate clocking signal to its gate ($C_{TR}$), allowing the integrated detector charge now stored on capacitor 21 to equilibrate with that on capacitor 22, and causing $V_{OUT}$ to step to a different level determined by the resulting charge on capacitor 22. This completes the sequence of operations for a frame; output signals for subsequent frames are derived in the same fashion.

The output waveform, a step function, may be sampled at two moments a short time apart (comparable to delta $t_2$ in FIG. 1) to virtually eliminate the kTC noise associated with the reset FET. Also, because the sampling rate is so much higher than in other techniques (on the order of ten microseconds) the 1/f noise is greatly diminished, as is low-frequency substrate noise. In addition, since the same reset bias level is applied to both the reset and detector signal levels of the output waveform, by subtracting them, the noise common to both is cancelled. And since only one transition occurs in the output waveform ($V_{OUT}$), increased readout rates may be achieved.

Figure 3:
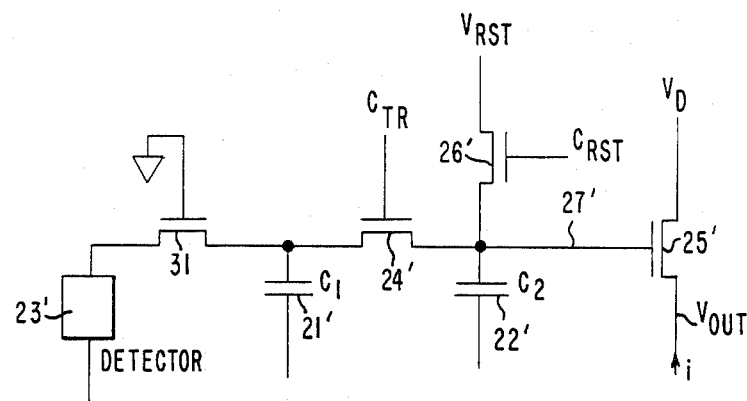
FIG. 3 is a schematic diagram of another circuit employing the technique of the present invention.

A variation of the circuit shown in FIG. 2 is presented in FIG. 3. (Primed numbers in FIG. 3 indicate elements corresponding to the unprimed numbers of FIG. 2.) It employs a FET 31 between the infrared detector 23' and capacitor 21' to act as a buffer and in keeping the detector bias constant, as well as to allow direct injection of the current produced by the detector onto the temporary storage capacitor 21'. In the circuit of FIG. 3, resistor 28 has been replaced by an equivalent arrangement for deriving the output signal, namely a constant current source (i) such as an FET.

Figure 4:
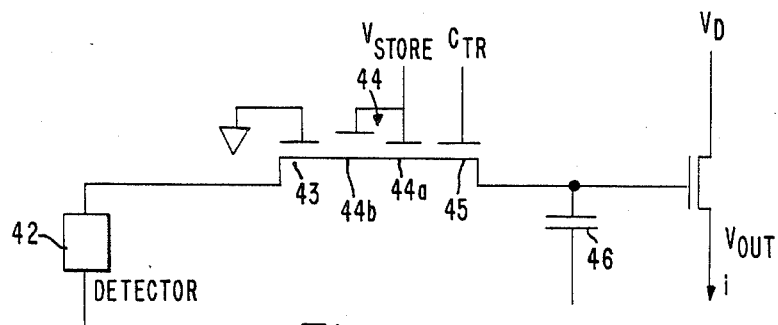
FIG. 4 is a schematic diagram of still another circuit employing the technique of the present invention.

Another circuit employing the technique of the present invention to minimize the effect of noise on an infrared readout circuit is shown in FIG. 4. In the circuits shown in FIGS. 2 and 3, the sense capacitance was the sum of capacitors 21 and 22 for detectors with negligible capacitance. If the detector is a photoconductive device, or if the detector current is large enough to lower the circuit input impedance compared to the detector's impedance, the circuit shown in FIG. 4 is preferred. It can be termed a storage well circuit.

In the FIG. 4 circuit, the temporary storage capacitor has been replaced by an FET storage well. More particularly, a semiconductive device 41 connected to a detector 42 includes a grounded-gate FET 43, a storage well FET 44 consisting of a poly 1 gate 44a and a poly 2 gate 44b, and a transfer gate FET 45. By pulsing a potential, $V_{STORE}$, attached to the storage well FET 44, charge may be transferred from the storage well to create an empty storage well and a reset level on connected capacitor 46. Thereafter, the output of detector 42 is allowed to fill the storage well 44 through FET 43. Then $V_{STORE}$ is pulsed again to force all of the charge out of well 44, through transfer gate 45 (by clocking the transfer gate voltage $C_{TR}$) and onto sensor capacitor 46. This sequence results in an output, $V_{OUT}$, which steps from one level, equivalent to the toe of the ramp in FIG. 1, to a second level determined by the charge stored in and forced out of the well, equivalent to the heel (or peak) 15 of the ramp shown in FIG. 1. The effect of the fast interface state (FIS) noise (the variation in step 14 shown in FIG. 1) may be minimized by appropriately shaping the potential well of the charge storage area, or bucket, of device 41.

In the circuit shown in FIG. 4, the net sense capacitance has the value of capacitor 46. All of the output produced by the detector and stored in the FET storage well 44 will be transferred to that capacitor. As an alternative, a Tompsett sampler circuit may be used. It eliminates the need for a storage well, yet is compatible with normal IR detector array output circuits.

In the circuit shown in FIG. 5, a photovoltaic IR detector produces a signal which is applied as $V_{IN}$ to semiconductive element 51. Included in this element is a gate clock FET 52. At the start of a frame interval, the gate clock FET is turned on and the diffusion clock signal pulsed to place the voltage of $V_{IN}$ on capacitor 53. The gate clock is then turned off and $V_{IN}$ changes due to the output of the detector circuit. When $S_3$ occurs (see FIG. 1) the value of $V_{OUT}$ is sampled (being at that instant the reset $V_{IN}$, or $S_{21}$ on capacitor 53). Then the gate clock is turned on and the diffusion clock pulsed to place the new value of $V_{IN}$ on capacitor 53. The output, $V_{OUT}$, is again sampled, the difference in the two successive samples determining the output signal of the detector for that frame. The advantages of this Tompsett sampler circuit stem from the fact that the input waveform $V_{IN}$ is now controlling the gate of the FET semiconductive element. This isolates $V_{IN}$ so that the signal coming from the detector need not be stiff.

As another example of useful circuitry which can be developed employing the technique of the present invention, the output of the IR detector, or a charge proportional to that output, may be amplified and the gain associated with the amplification precisely controlled by the circuit shown in FIG. 6. This circuit may be termed a charge amplifier circuit. In it, the input signal, $V_{IN}$, is again used, this time to control an FET gate 61. A second gate 62 is used for switching and isolation. To initiate the sequence of operations during a frame, both capacitors 63 and 64 are set to an initial voltage level using the reset FET 65 by pulsing $C_{RST}$ and $C_{SA}$. The capacitor 63 is isolated by pulsing the clock signal applied to control gate 62, and capacitor 64 brought to a different voltage level by pulsing $C_{SA}$ applied to the gate of FET 65, the different voltage level being determined by $C_{RST}$. Charge is allowed to accumulate at the $V_{IN}$ gate until the control gate 62 is again opened by the clock signal, this corresponding to point $S_3$ of FIG. 1. The $V_{IN}$ gate then becomes the control gate, and charge is transferred from capacitor 63 to capacitor 64 by an amount equal to the change in voltage of the $V_{IN}$ waveform. Assuming that capacitor 63 is greater than capacitor 64, the voltage change across capacitor 64 will be larger than that across capacitor 63 by the ratio of these two capacitances $C_{63}/C_{64}$. In this manner, the detector's output may be amplified in an precisely controlled way.

Another circuit employing the technique of the present invention, and using a synthetic transimpedance amplifier (TIA), is shown in FIG. 7. The operation of this circuit is similar to that of the circuit shown in FIG. 4, except that a TIA is used to buffer the detector input. The TIA is formed by FETs 71 and 72. A gate bias voltage, $V_G$, is applied to the gate of FET 71. A drain voltage, $V_{D1}$, is applied to one side of FET 71, and a source supply voltage, $V_S$, is applied to one side of FET 72. The TIA itself is set for negative gain, by appropriately adjusting the applied voltages, and acts as a buffer for the input waveform applied to FET 73 of semiconductive element 74 by lowering the input impedance by the gain of the amplifier at low detector current levels. It also reduces the bias change across the detector. The voltage step output signal is now transmitted in a substantially noise-immune form off focal plane where it can be easily amplified.

To generate the desired level of change, or delta, in the detector's output signal, a circuit such as shown in FIG. 8 may be employed. Basically, it is a clamp sample and hold circuit.

In accordance with the technique previously described, as illustrated in the various circuits set forth herein, an integrating IR imaging device is achieved which exhibits both low noise and high sensitivity. By transferring a charge packet onto a capacitive element, a signal change or delta proportional to the voltage present on that capacitor can be measured and employed as the output. Such a technique, and circuitry employing it, may be applied to any general analog system where low-noise characteristics are required. Each of the circuits described herein incorporates this delta transfer technique to convert the IR detector signal to an output voltage signal that can be multiplexed or otherwise used by the rest of the electronics system. The delta transfer technique significantly increases immunity of the detector's output to virtually all the various noise sources commonly encountered.

Of course, others skilled in this field, when employing the delta transfer technique, may prefer to use circuits somewhat different than those set forth herein. Accordingly, the scope of the invention is not limited to such circuits, but rather is set forth in the following claims.

What is claimed is:

1. A method of obtaining a signal from a radiation detector comprising the steps of:
   conductively coupling together a first capacitor and a second capacitor;
   resetting the first capacitor and the second capacitor to a predetermined voltage potential;
   conductively uncoupling the first capacitor from the second capacitor;
   integrating on the first capacitor for a predetermined interval of time an output signal from a radiation detector to produce a detector signal voltage potential across the first capacitor;
   determining the magnitude of a quiescent voltage potential across the second capacitor, the quiescent voltage potential being a function of the predetermined voltage level;
   conductively coupling together the first and the second capacitors;
   equilibrating the detector signal voltage potential and the quiescent voltage potential to obtain a difference voltage potential; and
   determining the magnitude of the difference voltage potential, the magnitude of the difference voltage potential being a function of an amount of radiation incident upon the radiation detector during the predetermined interval of time.

2. A method as defined in claim 1 wherein the predetermined interval of time is related to a frame interval.

3. A method as defined in claim 1 wherein the steps of conductively coupling together are accomplished by clocking a gate terminal of a FET device having a source terminal and a drain terminal coupled between the first and the second capacitors for conductively coupling together the first and the second capacitors.

* * * * *